United States Patent
Sano

[11] Patent Number: 6,130,425
[45] Date of Patent: Oct. 10, 2000

[54] ROTATING DETECTING DEVICE OF MULTI-ROTATION BODY

[75] Inventor: Tadashi Sano, Miyagi-ken, Japan

[73] Assignee: Alps Electric Co., Ltd., Tokyo, Japan

[21] Appl. No.: 09/023,022

[22] Filed: Feb. 12, 1998

[30]     Foreign Application Priority Data

| Feb. 14, 1997 | [JP] | Japan | ................................... | 9-030592 |
| Jun. 27, 1997 | [JP] | Japan | ................................... | 9-171678 |
| Oct. 6, 1997 | [JP] | Japan | ................................... | 9-272801 |

[51] Int. Cl.$^7$ .................................................. G01D 5/347
[52] U.S. Cl. .............................. 250/231.14; 250/231.15; 250/231.18; 341/3; 341/31
[58] Field of Search ........................ 250/231.13, 231.14, 250/231.15, 231.16, 231.18, 237 G; 341/2, 3, 11, 13, 31; 356/375

[56]                References Cited

U.S. PATENT DOCUMENTS

| 4,358,753 | 11/1982 | Cascini ............................... | 250/231.13 |
| 5,206,590 | 4/1993 | Dieny et al. . | |
| 5,393,201 | 2/1995 | Okutani et al. ..................... | 250/231.15 |
| 5,457,371 | 10/1995 | Gordon ....................................... | 341/2 |
| 5,640,007 | 6/1997 | Talbott et al. ....................... | 250/231.15 |

Primary Examiner—Stephone Allen
Attorney, Agent, or Firm—Brinks Hofer Gilson & Lione

[57]              ABSTRACT

Disclosed is a rotation detecting device of a multi-rotation body, in which a code plate of an incremental encoder is fixedly mounted to a first rotor which is rotatably supported on a housing; a small-diameter portion and a large-diameter portion are formed on the outer peripheral surface of the first rotor; and furthermore a pair of engaging projections are formed on both sides of a clearance groove formed in the large-diameter portion. A rotating ring is mounted on the inside bottom surface of the housing; on the rotating ring is formed a driven gear through a range of about 90 degrees, and a shield plate is erected in a position corresponding to the driven gear. Five photo-interrupters are arranged astride the shield plate on the path of rotation of the rotating ring, so that the position of the rotating ring can be detected by the ON/OFF operation of the photo-interrupters. On the housing an intermediate gear is rotatably supported, and is in constant mesh with the driven gear. On the intermediate gear are provided a first tooth portion and a second tooth portion, which are arranged 45 degrees apart from each other. The first tooth portion faces the small-diameter portion of the first rotor, while the second tooth portion faces the large-diameter portion, whereby the intermediate gear is turned through about 90 degrees by the engaging projections during one rotation of the first rotor, thus turning the rotating ring by two teeth of the driven gear.

11 Claims, 13 Drawing Sheets

DIRECTIONAL PATTERN (LED SIDE)

DIRECTIONAL PATTERN (PHOTO-Tr SIDE)

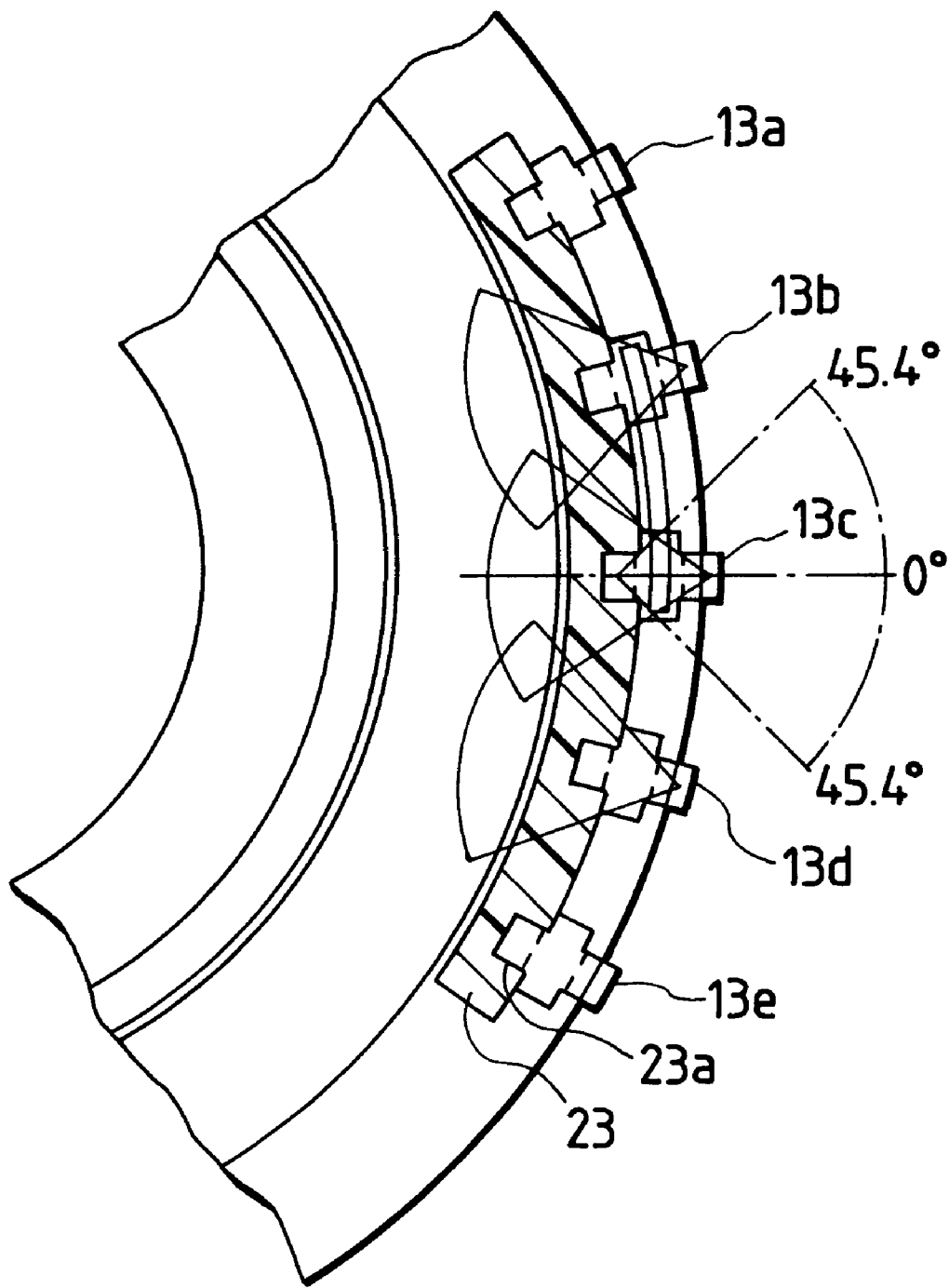

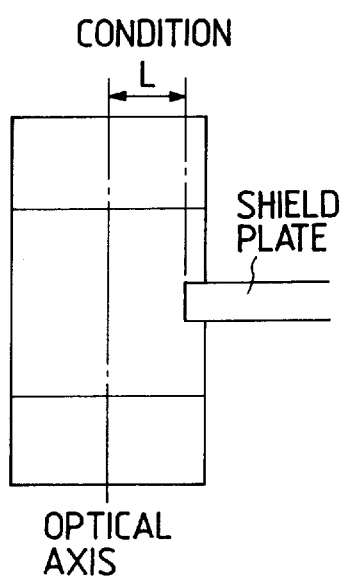
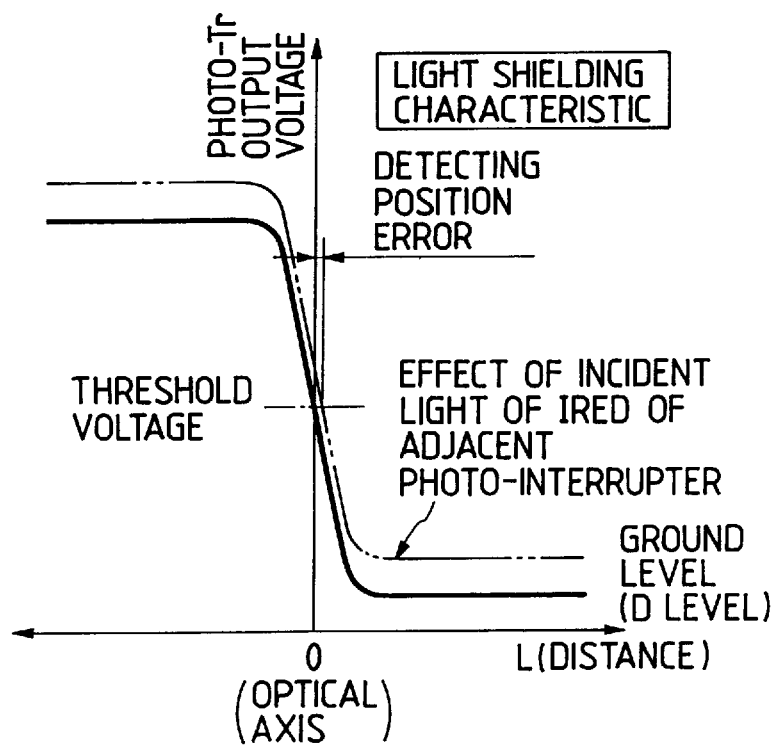
FIG. 18A
FIG. 18B

CONDITION

A : PHOTO-Tr ON & IRED OFF
B : PHOTO-Tr OFF & IRED ON

ROTATING DETECTING DEVICE OF MULTI-ROTATION BODY

BACKGROUND OF THE INVENTION

1. Field of the Invention

The present invention relates to a rotation detecting device of a multi-rotation body, such as a steering wheel used in an automotive vehicle, which turns within a limited number of rotations, at least one rotation, and more particularly, to a rotation detecting device suitable for detecting the absolute position of the multi-rotation body.

2. Description of the Related Art

For the detection of rotation there has been proposed such a device designed to detect by an incremental encoder a precision steering-wheel angle of one rotation or less, and also to detect by an absolute encoder a coarse angle of one rotation or over of the steering wheel, so that the steering-wheel angle from a neutral position will be determined on the basis of a combination of these fine and coarse angles of rotation of the steering wheel.

The incremental encoder is comprised of a code plate which rotates integrally with a steering shaft, and a photo-interrupter oppositely disposed through the code plate. This encoder can detect only the turning angle of one rotation or less of the code plate; therefore the rotation of the code plate turning as one body with the steering shaft can be detected with high accuracy. On the other hand, the absolute encoder is comprised of a substrate having a resistance pattern thereon, a speed-reducing rotation body having a brush sliding on the resistance pattern, and a gearing for transmitting the rotation of the steering wheel to the speed-reducing rotation body. Since the rotation of the multi-rotation steering wheel is reduced through the gearing to one rotation or less, it is possible to detect the absolute position of the steering wheel.

In the above-described prior art, however, because the absolute encoder uses a gearing comprising a sun gear provided on a rotor member, a circular internal gear provided on a stator member, and a planetary gear engaged between the sun gear and the circular internal gear, there is such a drawback that a wide space is needed to mount the gearing which occupies the whole body of the rotation detecting device Furthermore, there also arises such a drawback that since the planetary gear is in constant mesh with both the sun gear and the circular internal gear, the speed-reducing rotation body supporting the planetary gear tends to rotate with a slight rotation of the steering wheel; particularly because the steering wheel is very often rotated (operated) in the vicinity of the neutral position, the resistance pattern is likely to get locally worn.

It is conceivable to use an optical detecting means to detect by a plurality of photo-interrupters the amount of rotation of the speed-reducing rotation body in place of the aforementioned resistance-type detecting means. In this case, however, one photo-interrupter is likely to be affected by an adjacent photo-interrupter, doing a mulfunction. Particularly there exists such a new drawback that when a small-sized rotation detecting device is employed to reduce a pitch of arrangement between the photo-interrupters, an adverse effect between adjacent photo-interrupters will become remarkable.

SUMMARY OF THE INVENTION

The present invention overcomes the drawbacks of the prior art by providing a rotation detecting device for detecting the rotation of a multi-rotation body which adopts, as an absolute encoder, a gearing comprising an engaging projection provided on the peripheral surface of a rotor member, a driven gear concentrically arranged on the rotational center of the rotor member, and an intermediate gear interposed between the rotor member and the driven gear. In the device adopting such a gearing, the intermediate gear intermittently rotates by a predetermined angle only when it meshes with an engaging projection during a single turn of the rotor member, and also the driven gear in constant mesh with the intermediate gear similarly rotates intermittently by a predetermined angle; therefore the amount of local wear of mechanical parts resulting from continuous operation will largely be reduced. At the same time, since the driven gear makes a digital rotation, a signal (of the number of rotations) can very easily be taken out. Furthermore, since it is unnecessary to form the driven gear throughout the periphery, the layout of component parts can be accomplished with room, thereby enabling the miniaturization of the device.

Furthermore, the present invention adopts a gearing as an absolute encoder comprising an engaging projection provided on the peripheral surface of the rotor member, a driven gear concentrically arranged on the rotational center of the rotor member, and an intermediate gear interposed between the rotor member and the driven gear; and the intermediate gear is supported by an elastic member. In a device using such a gearing, the intermediate gear rotates intermittently by a predetermined angle only when it meshes with the engaging projection during a single rotation of the rotor member, and also the driven gear which is in contact mesh with the intermediate gear rotates intermittently by a predetermined angle. It is, therefore, possible to largely reduce the amount of local wear of component parts resulting from continuous operation. Also, since the amount of rotational motion of the driven gear varies by stages, the signal (of the number of rotations) can very easily be taken out. Also since the driven gear is not needed to be formed all around, there is room for the layout of component parts, thereby enabling the miniaturization of the device. Furthermore, since the intermediate gear moves while radially escaping against an elastic member when the engaging projection has come into contact with the tooth portion of the intermediate gear, a tapping sound likely to occur the instant the engaging projection contacts the intermediate gear can be reduced. That is, it is possible to reduce vehicle noise.

Furthermore, the present invention uses, as a rotation detecting means of the absolute encoder, an optical detecting means including a rotary means intermittently rotating in interlock with the rotation of the rotor member and a plurality of photo-interrupters arranged on the locus of rotation through which the shield plate of the rotating member passes; and also, of a light-emitting element and a light-receiving element which constitute each photo-interrupter, the element having a wide directivity is arranged on the inner periphery side. When this type of optical detecting means is adopted, the amount of rotation of the rotating member which intermittently rotates is detected in a non-contact manner by a signal outputted from each photo-interrupter, thereby enabling not only substantial extension of life of the detecting portion but also reduction of a change in a switching (ON/OFF) position by detecting the light (leaking) from the light-emitting element of an adjacent photo-interrupter and accordingly an improvement in detecting accuracy.

The device for detecting the rotation of the multi-rotation body according to the present invention has the rotor member rotating as one body with the code plate of the rotary encoder, the stator member rotatably holding the rotor member, the intermediate gear pivoted on the stator member, the rotating member concentrically arranged on the rotational center of the rotor member, and the detecting element for detecting the amount of rotation of the rotating member; the intermediate gear being in intermittent mesh with the engaging projection provided on the peripheral surface of the rotor member and also in constant mesh with the driven gear provided on the rotating member.

In the case of the rotation detecting device of the aforesaid constitution, the intermediate gear pivoted on the stator member rotates by a predetermined angle only when it meshes with the engaging projection during one rotation of the rotor member, thereby turning the driven gear by the number of teeth corresponding to the amount of the rotation; therefore the rotating member formed integral with the driven gear rotates only by a predetermined amount. It is, therefore, possible to know the number of rotations (rotation area) by detecting by the use of the detecting element the amount of rotation or rotational position of the rotating member.

Furthermore, the rotation detecting device for detecting the rotation of the multi-rotation body has a rotor member rotating as one body with the code plate of the rotary encoder, a stator member rotatably holding the rotor member, a rotating member concentrically arranged on the rotational center of the rotor member, an intermediate gear pivoted on the rotating member, and a detecting element for detecting the amount of rotation of the rotating member; the intermediate gear being in intermittent mesh with the engaging projection provided on the peripheral surface of the rotor member and also in constant mesh with the driven gear provided on the stator member.

In the rotation detecting device of such a constitution, the intermediate gear in constant mesh with the driven gear of the stator member meshes with the engaging projection during one rotation of the rotor member to make a predetermined angle of rotation and revolution, and the rotating member supporting the intermediate gear turns by the same amount as the amount of revolution, thereby enabling detecting the amount of rotation of the rotating member by the detecting element.

As the detecting element, any one of the following elements are usable: an optical detecting element utilizing a photo-interrupter and a photo-reflector, a magnetic detecting element utilizing a magnet, an MR element and a Hole element, and a contact-type detecting element utilizing a brush and a resistance pattern.

It is to be noticed that the number of the engaging projection to be provided on the peripheral surface of the rotor member is not limited to one, and that the peripheral surface of the rotor member may be equally divided into the same angle of regions and an engaging projection may be provided in each of the divided regions. For example, if three sets of engaging projections are provided at intervals of 120 degrees on the peripheral surface of the rotor member, the intermediate gear intermittently rotates three times at every 120 degrees during one rotation of the rotor member. Therefore, it is possible to detect the number of rotations (rotational area) every 120 degrees by the use of the detecting elements provided in corresponding positions.

The intermittent gear to be employed may be of any type so long as it meshes intermittently with the engaging projection and is in constant mesh with the driven gear. It is, however, possible to prevent the intermediate gear from idling when the intermediate gear is not in mesh with the engaging projection, by forming small- and large-diameter portions via a step on the peripheral surface of the rotor member, providing an engaging projection on both side of a clearance groove formed in the large-diameter portion, and further by alternately forming, on the intermediate gear, a first tooth portion facing the peripheral surface of the small-diameter portion and a second tooth portion facing the peripheral surface of the large-diameter portion.

Furthermore, the rotation detecting device of the present invention for detecting the rotation of the multi-rotation body is comprised of a rotor member rotating as one body with the code plate of the rotary encoder, a stator member rotatably holding the rotor member, an intermediate gear rotatably pivoted through an elastic member on the stator member, an engaging projection provided on the peripheral surface of the rotor member and in intermittent mesh with the intermediate gear, a rotating member concentrically arranged on the rotational center of the rotor member, a driven gear provided on the rotating member and constant mesh with the intermediate gear, and a detecting element for detecting the amount of rotation of the rotating member, so that the intermediate gear will radially move against the elastic member when the intermediate gear meshes with the engaging projection.

In the rotation detecting device of the aforementioned constitution, the intermediate gear pivoted on the stator member rotates by a predetermined angle during one rotation of the rotor member only when the intermediate gear engages with the engaging projection, thereby turning the driven gear by the number of teeth corresponding to the amount of rotation; therefore the rotating member formed integrally with the driven gear rotates only by the predetermined amount. Therefore, it is possible to know the number of rotations (rotational area) by detecting by the detecting element the amount of rotation or rotational position of the rotating member. Moreover as the engaging projection contacts the tooth portion of the intermediate gear, the intermediate gear moves while escaping radially against the elastic member, thereby reducing a tapping sound which is produced the instant the engaging projection contacts the intermediate gear.

Furthermore, the rotation detecting device of the present invention for detecting the rotation of the multi-rotation body, has a rotor member rotating as one body with the code plate of the rotary encoder, a stator member rotatably holding the rotor member, a rotating member concentrically arranged on the rotational center of the rotor member, an intermediate gear rotatably pivoted through an elastic member on the rotating member, an engaging projection which is provided on the peripheral surface of the rotor member and intermittently meshes with the intermediate gear, a driven gear which is provided on the stator member and is in constant mesh with the intermediate gear, and a detecting element for detecting the amount of rotation of the rotating member; and the intermediate gear when engaging with the engaging projection, radially moves against the elastic member.

In the rotation detecting device of the aforementioned constitution, the intermediate gear in constant mesh with the driven gear of the stator member engages with the engaging projection during one rotation of the rotor member, rotating and revolving by a predetermined angle. As the rotating member supporting the intermediate gear rotates by the same amount as the amount of revolution, the amount of rotation of this rotating member is detected by the detecting element. In addition, when the engaging projection contacts the tooth portion of the intermediate gear, the intermediate gear moves while escaping radially against the elastic member, thereby enabling reducing the tapping sound which is produced the instant the engaging projection contacts the intermediate gear.

When the intermediate gear is provided with a shaft bore, interposition of an elastic member between the shaft bore and a boss supporting the shaft bore suffices; and also when the intermediate shaft is mounted on the rotating shaft, interposition of an elastic member between the rotating shaft and the shaft bore supporting the shaft is sufficient.

Furthermore, as the elastic member, a cylindrical sponge or rubber member is usable, but the use of a coil spring, even a small coil spring, having large- and small-diameter portions enables giving a long-time, sufficient resilience and also restraining an increase in a torque to thereby insure smooth rotation of the intermediate gear. In this case, as the intermediate gear can radially move by the amount of difference in the coil diameter of the coil spring on the large- and small-diameter portions, the intermediate gear rotates, with the coil spring deflected, while moving in the direction of escape the instant the engaging projection contacts the tooth portion of the intermediate gear.

Furthermore, the rotation detecting device of the present invention for detecting the rotation of the multi-rotation body has a rotor member rotating as one body with the code plate of the rotary encoder, a stator member rotatably holding the rotor member, a rotating member concentrically arranged on the rotational center of the rotor member, an intermediate gear for intermittently transmitting the rotation of the rotor member to the rotating member, and a plurality of photo-interrupters concentrically arranged on the rotational center of the rotor member. Of the light-emitting element and the light-receiving element which constitute the photo-interrupters, an element having a wider directivity is arranged on the inner periphery side. The shield plate provided on the rotating member passes through between the light-emitting element and the light-receiving element of the photo-interrupters, thereby detecting the amount of rotation of the rotating member.

Arranging the element of the photo-interrupters which has a wider directivity, within a recess of a positioning member made of a light-shielding material, can improve the positional accuracy of each photo-interrupter. Since the directivity of the element arranged towards the inner periphery side is narrowed by the positioning member, it is possible to reduce a change in the switching (ON/OFF) position caused by the detection of light leakage from the light-emitting element of adjacent photo-interrupters.

BRIEF DESCRIPTION OF THE DRAWINGS

The present invention may be further understood by reference to the drawings, wherein:

FIG. 17 is a plan view showing the major portion of the rotation detecting device of a sixth embodiment according to the present invention;

FIGS. 18A and 18B are explanatory views showing the light shielding characteristic of the photo-interrupter.

DESCRIPTION OF THE PREFERRED EMBODIMENTS

Figure 1:
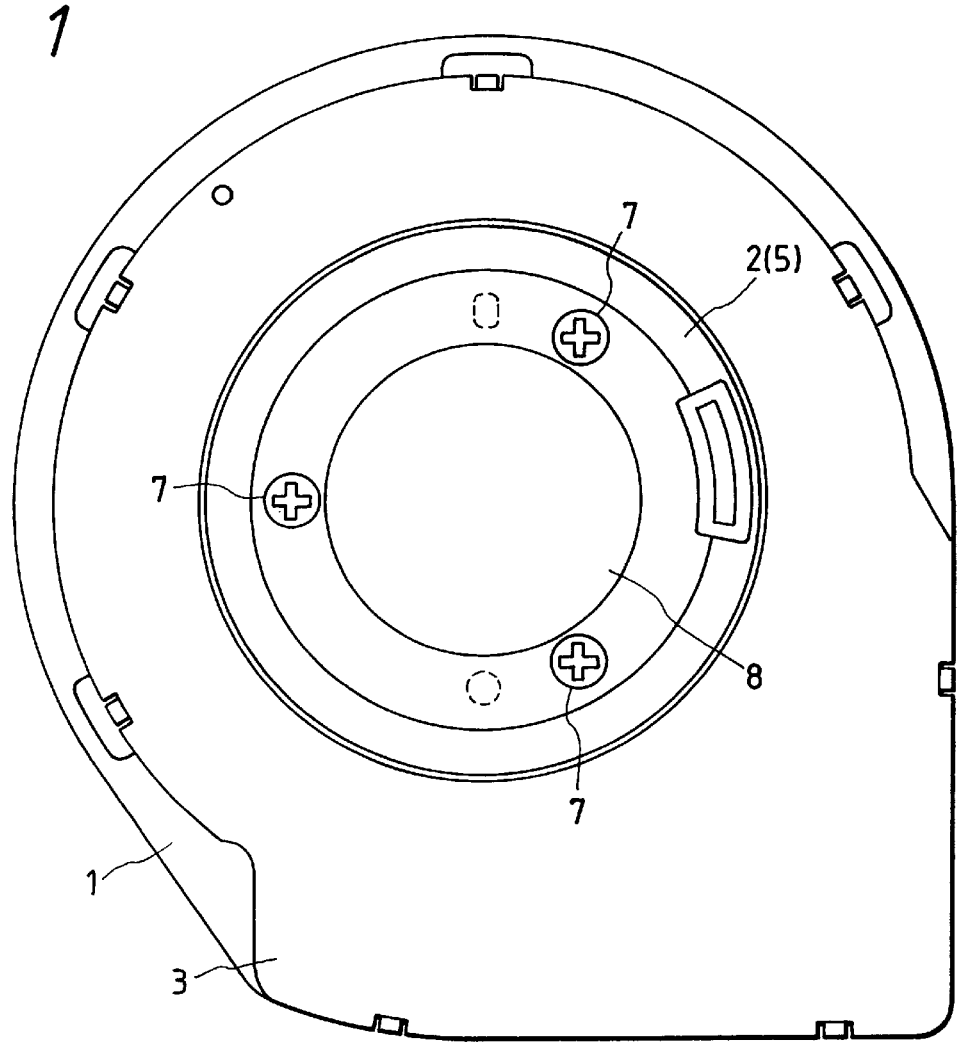
FIG. 1 is a plan view showing a first embodiment of a rotation detecting device of the present invention.
Figure 2:
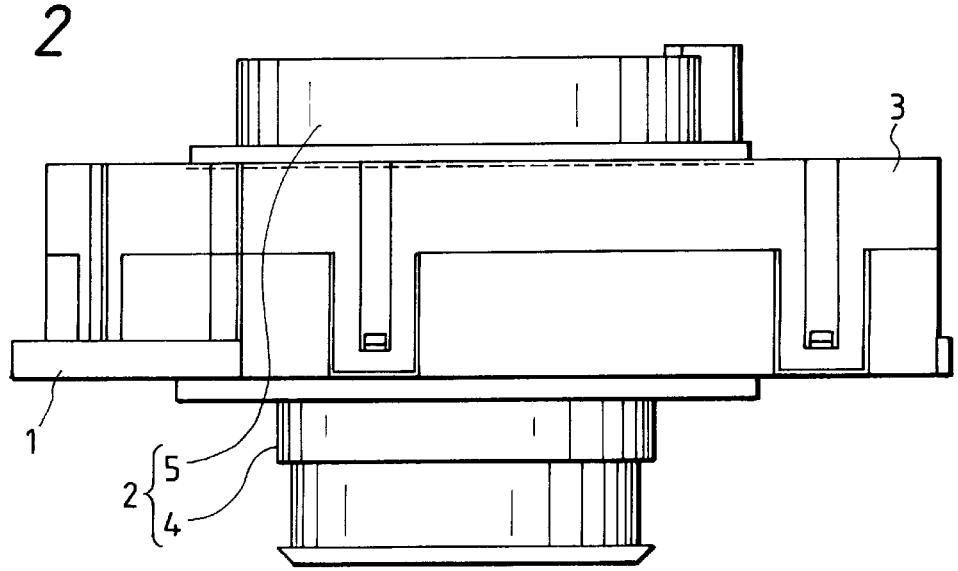
FIG. 2 is a side view of the rotation detecting device.
Figure 3:
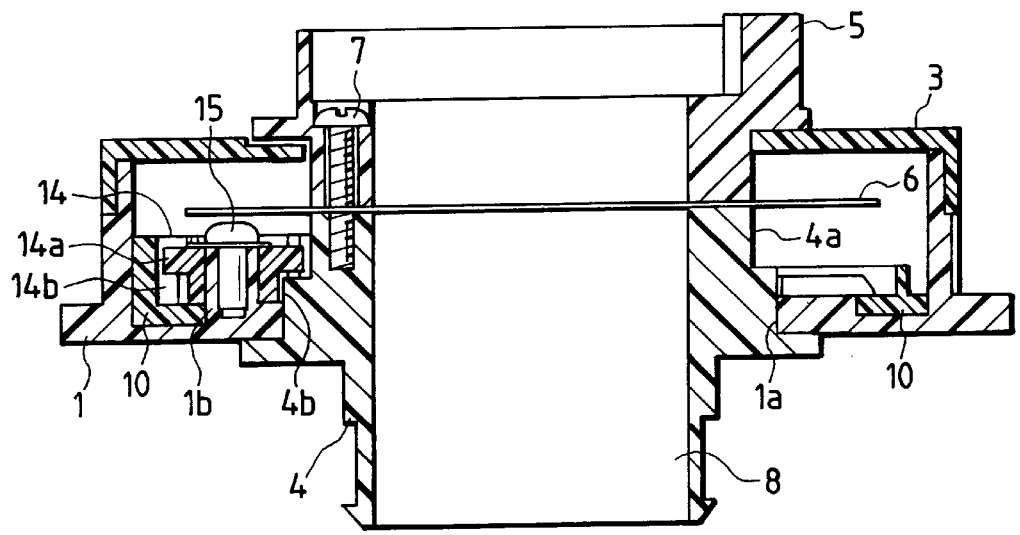
FIG. 3 is a sectional view of the rotation detecting device.
Figure 4:
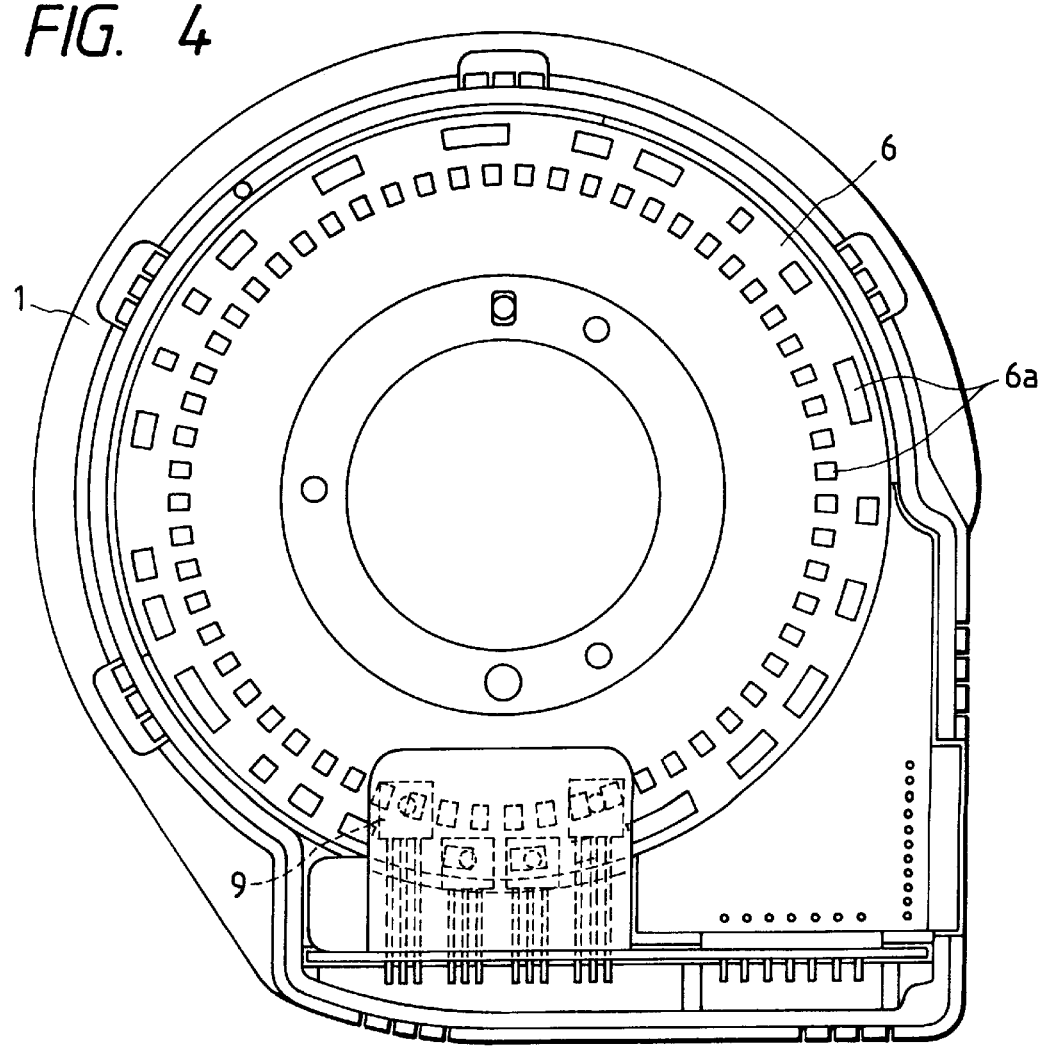
FIG. 4 is a plan view showing the rotation detecting device off a cover.
Figure 5:
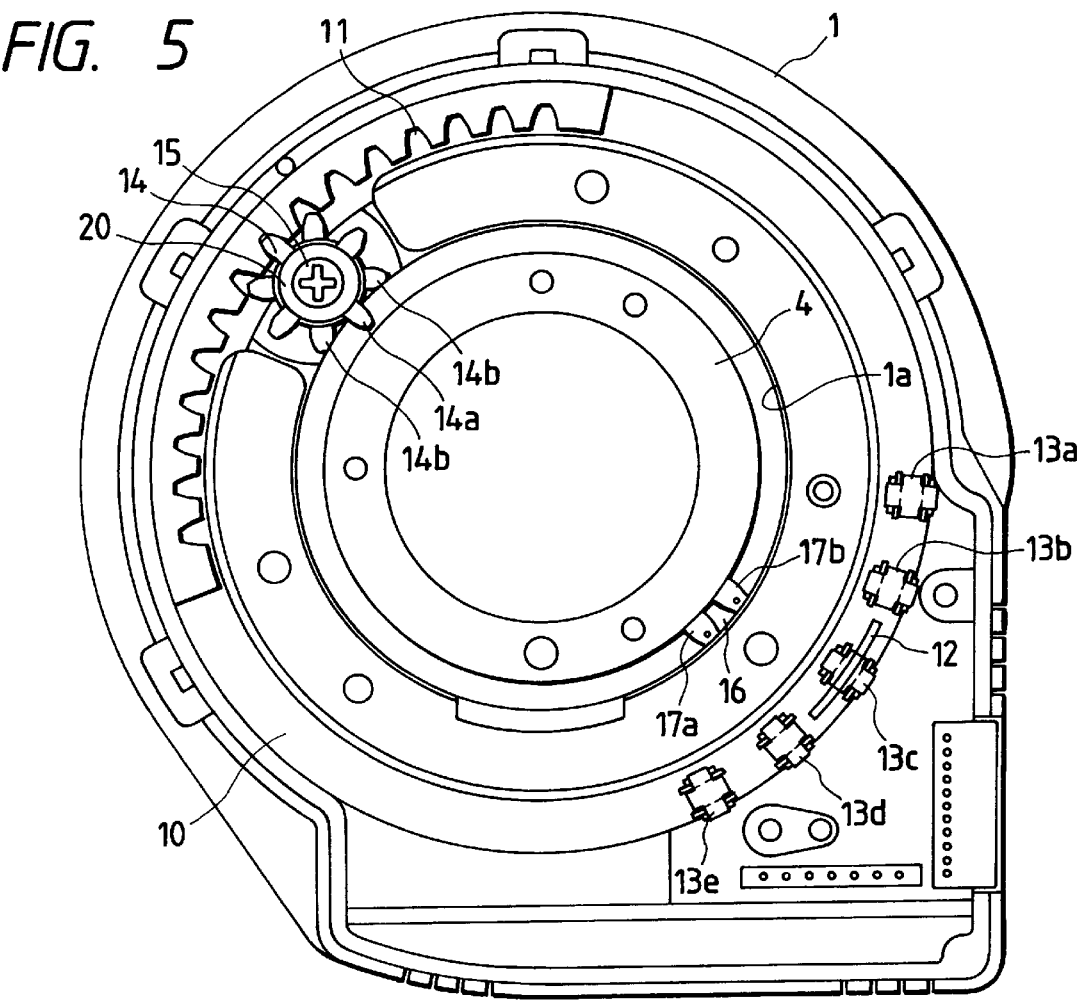
FIG. 5 is a plan view showing the rotation detecting device off the cover and a code plate.
Figure 6:
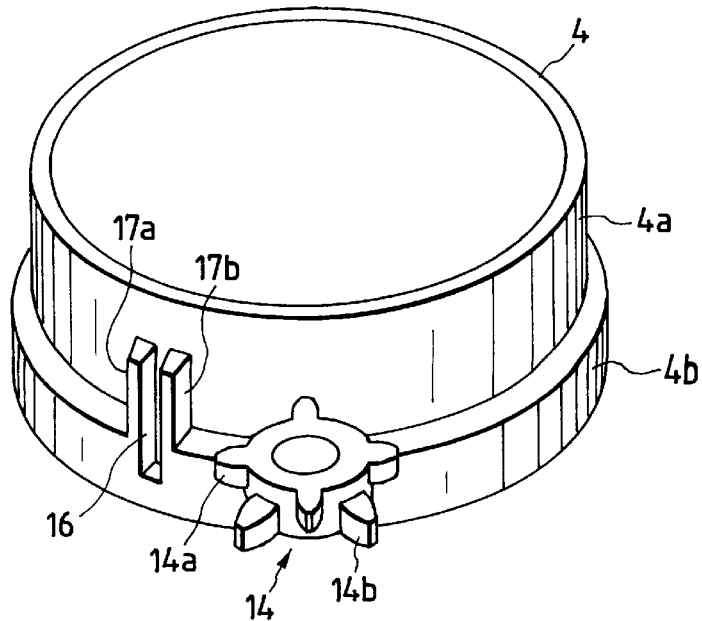
FIG. 6 is a perspective view showing a major portion of a gearing provided in the rotation detecting device.

Preferred embodiments of a rotation detecting device will be explained with reference to the accompanying drawings, in which FIG. 1 is a plan view of a first embodiment of the rotation detecting device; FIG. 2 is a side view of the rotation detecting device; FIG. 3 is a sectional view of the rotation detecting device; FIG. 4 is a plan view showing the rotation detecting device with a cover removed; FIG. 5 is a plan view showing the rotation detecting device with the cover and a code plate removed; FIG. 6 is a perspective view showing a major portion of a gearing provided in the rotation detecting device; and FIG. 7 is an explanatory view of the operation of the gearing.

The rotation detecting device of the present embodiment includes a housing 1 having a guide hole 1a, a rotor member 2 which is rotatable on the center of the guide hole 1a, and a cover 3 which covers the open end of the housing 1, in which later-described incremental encoder and an absolute encoder for checking the number of rotations are housed. The housing 1 is a stator member, which is secured by a screw to for instance a combination switch casing and a stationary body of a rotating connector when the rotation detecting device is mounted to a steering system in an automotive vehicle.

As shown in FIG. 3, the rotor member 2 is comprised of a first rotor 4 and a second rotor 5. These rotors 4 and 5 are assembled into one body by a plurality of screws 7 through a code plate 6. The rotors 4 and 5 and the code plate 6 are provided with a center bore 8, so that an unillustrated steering shaft is inserted into the center bore 8 when the rotation detecting device is installed into the steering system of the automobile and the steering shaft and the rotors 4 and 5 and the code plate 6 will turn at a ratio of 1:1. The code plate 6, as shown in FIG. 4, has a plurality of through holes 6a along the peripheral direction thereof, and A- and B-phase patterns are detected from four photo-interrupters 9 arranged astride these through holes 6a. These code plates 6 and the photo-interrupter 9 constitute the incremental encoder, which detects with a high accuracy the angle of rotation within one rotation of the code plate 6.

Next, the absolute encoder will be explained. As shown in FIG. 5, a rotating ring 10 as a rotating member is arranged on the inside bottom surface of the housing 1. The rotating ring 10 is rotatable on the concentrically same path as the guide the guide hole 1a. On the rotating ring 10 is formed a driven gear 11 through a range of about 90 degrees; in the opposite position of the driven gear 11 a shield plate 12 is erected. On the path of rotation of the rotating ring 10 five photo-interrupters 13a to 13e are arranged astride the shield plate 12. The photo-interrupters 13a to 13e are mounted on an unillustrated printed-circuit board. With the driven gear 11 the intermediate gear 14 meshes. The intermediate gear 14 is rotatably supported on the boss 1b which is erected on the inside bottom surface of the housing 1 and retained by a screw 15 from accidental detachment. The intermediate gear 14, as shown in FIGS. 3 and 5, is provided with a first tooth portion 14a having four teeth equally spaced at every 90 degrees and a second tooth portion 14b having four teeth also equally spaced at 90 degrees. The first and second tooth portions 14a and 14b are arranged 45 degrees apart from each other and are axially shifted in position.

As shown in FIG. 6, a small-diameter portion 4a and a large-diameter portion 4b are formed via a step on the outer peripheral surface of the first rotor 4, and at the step as a boundary the tooth portion 14a of the intermediate gear 14 faces the small-diameter portion 4a and the second tooth portion 14b faces the large-diameter portion 4b. A clearance groove 16 is formed in one place of the large-diameter portion 4b; and on both sides of this clearance groove 16 are formed a pair of engaging projections 17a and 17b.

Figure 7A:
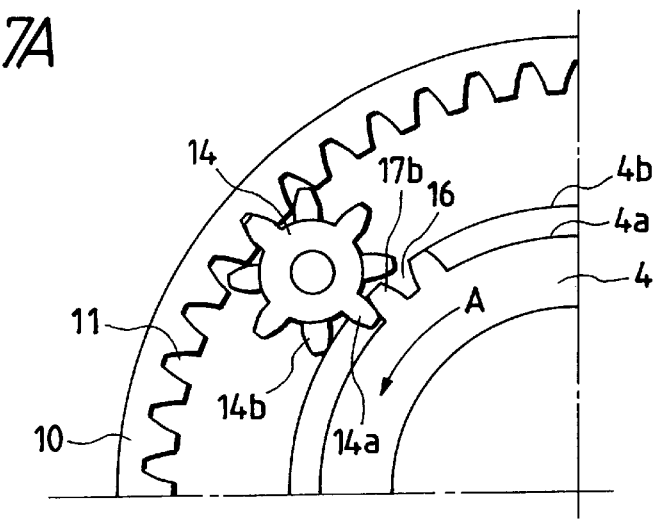
FIG. 7 which is comprised of FIGS. 7A, 7B, and 7C, provide views the operation of the gearing.
Figure 7B:
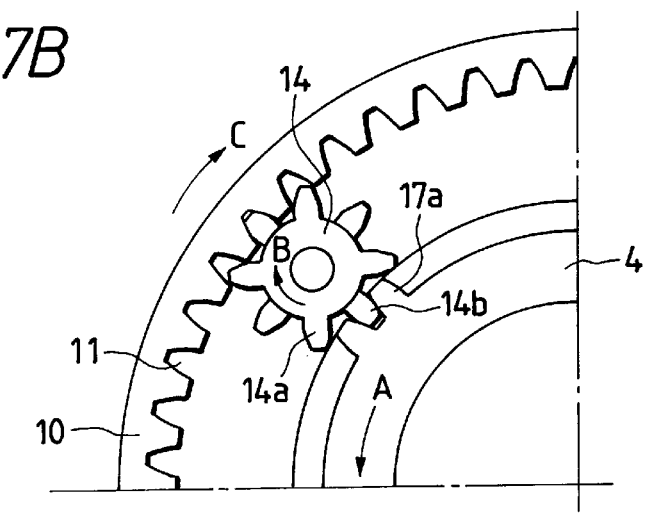
Figure 7C:
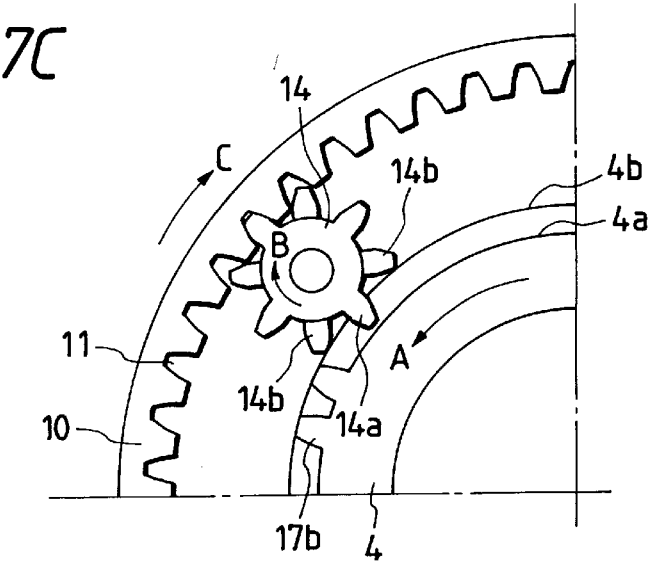

As shown in FIG. 7A, when the first rotor 4 rotates in the direction of the arrow A (counterclockwise direction), one of the teeth of the first tooth portion 14a facing the small-diameter portion 4a contacts the one engaging projection 17b; therefore, as shown in FIG. 7B, the intermediate gear 14 rotates about 45 degrees in the direction of the arrow B and one of the teeth of the second tooth portion 14b enters the clearance groove 16. When the first rotor 4 rotates in the direction of the arrow A from the state shown in FIG. 7B, one of the teeth of the second tooth portion 14b that has entered the clearance groove 16 is pressed by the other engaging projection 17a, and therefore the intermediate gear 14 further rotates about 45 degrees in the direction of the arrow B, the next one of the teeth of the first tooth portion 14a will face the small-diameter portion 4a again as shown in FIG. 7C. That is, since the intermediate gear 14 rotates about 90 degrees in the direction of the arrow B from the state of FIG. 7A to the state of FIG. 7C, the driven gear 11 is turned by two teeth in the direction of the arrow C and accordingly the rotating ring 10 rotates by a predetermined amount in the direction of the arrow C. Then when the engaging projection 17a has passed the intermediate gear 14, the intermediate gear 14 will be checked from turning idle because two teeth of the second tooth portion 14b are facing the large-diameter portion 4b during the following rotation of the first rotor 4. Because the intermediate gear 14 is turned about 90 degrees by the engaging portions 17a and 17b and the rotating ring 10 rotates by two teeth of the driven gear 11 during one rotation of the first rotor 4 as stated previously, the shield plate 12 also turns by two teeth in the same direction, moving to the shielding position of the adjacent photo-interrupter. That is, as the output of the photo-interrupters 13a to 13e to be energized varies, the absolute position (number of rotations) of the first rotor 4 can be detected.

Next, operation of the rotation detecting device thus constituted as described above will be explained. For example, as shown in FIG. 5, when the center photo-interrupter 13c is shielded by the shield plate 12, only the photo-interrupter 13c is on, while the other photo-interrupters 13a, 13b, 13d and 13e are off. Therefore the steering wheel is detected to be within the range of −180 deg to +180 deg in relation to the center reference. In the meantime the angle of rotation of the steering wheel within the range of −180 deg to +180 deg is detected with a high accuracy by each photo-interrupter 9 of the incremental encoder. When the rotor member 2 (the first rotor 4) rotates counterclockwise from the state of FIG. 5 until the shield plate 12 shields both the center photo-interrupter 13c and the adjacent photo-interrupter 13d, only these photo-interrupters 13c and 13d will be energized and detected to be within the range of +180 degrees. Furthermore, when the rotor member 2 rotates counterclockwise to turn on only the photo-interrupter 13d, the steering wheel will be detected to be within the range of +180 deg to +540 deg; the angle of rotation of the steering wheel within this range will be detected with a high accuracy by the incremental encoder. Similarly, the steering wheel is detected to be within the range of −900 deg. to +900 deg by the combination of ON/OFF operation of the photo-interrupters 13a to 13e.

Figure 8:
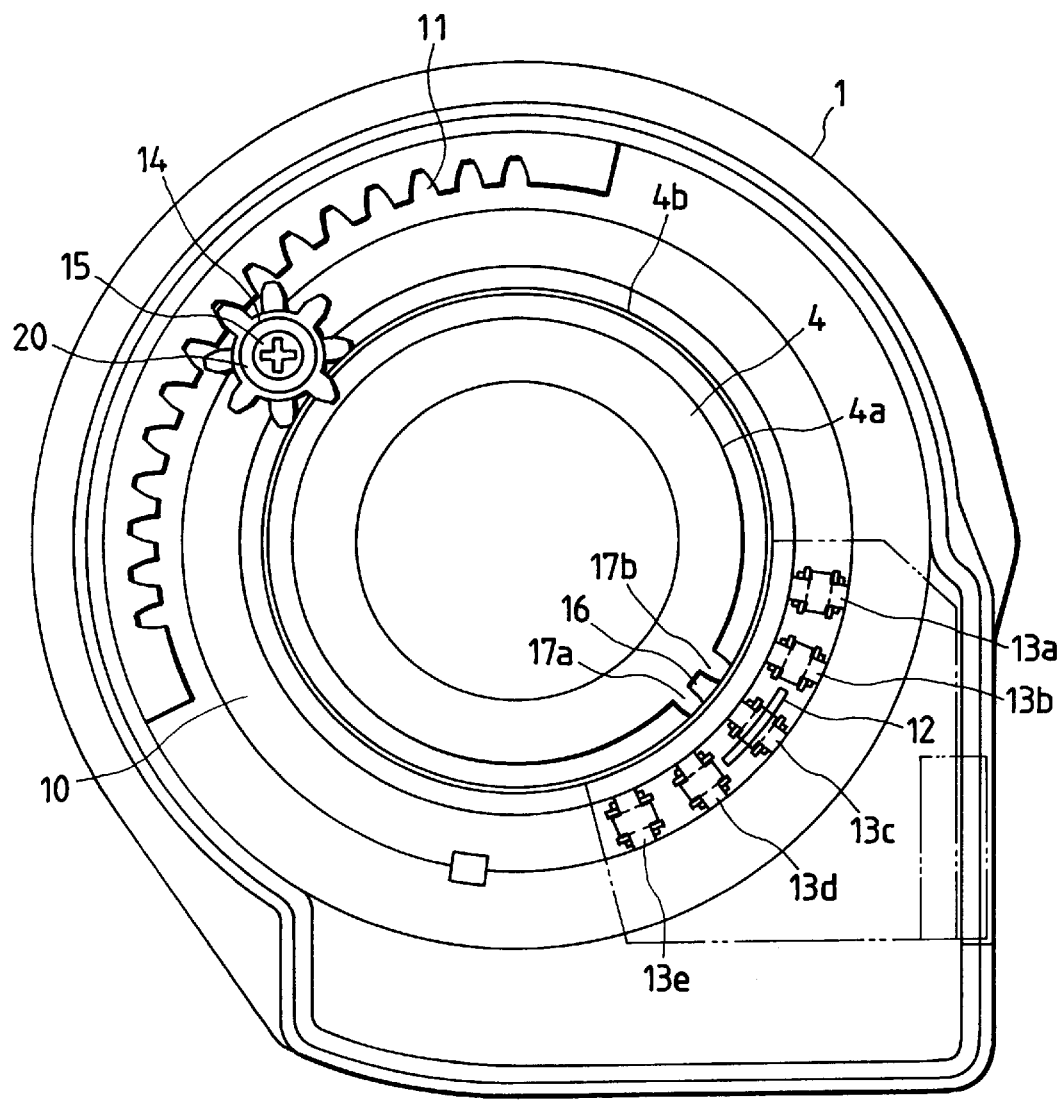
FIG. 8 is a plan view showing a major portion of the rotation detecting device of a second embodiment according to the present invention.

FIG. 8 is a plan view showing a major portion of a second embodiment of the rotation detecting device according to the present invention. In the present embodiment, the driven gear 11 is mounted on the housing 1 on the stationary side so that the driven gear may not rotate, and the intermediate gear 14 is supported on the rotating ring 10. The rotation detecting device of the present embodiment is basically the same in other constitution as that of the first embodiment.

In the second embodiment of the above constitution stated above, the intermediate gear 14, when turned by the engaging projections 17a and 17b during one rotation of the first rotor 4, revolves around the first rotor 4 while rotating about 90 degrees; therefore the rotating ring 10 supporting the intermediate gear 14 turns by two teeth of the driven gear 11. Therefore, the shield plate 12 provided on the rotating ring 10 also turns by two teeth, thus moving to the shielding position of the adjacent photo-interrupter. That is, the photo-interrupters 13a to 13e to be energized will change, thereby detecting the absolute position (the number of rotations) of the first rotor 4.

In the first and second embodiments heretofore explained, when the intermediate gear 14 and the engaging projections 17a and 17b are so set as not to engage with each other in the neutral position of the steering wheel, it is possible to reduce a noise likely to occur at the time of contact of the intermediate gear 14 with the engaging projections 17a and 17b of the rotor during travel of the vehicle notwithstanding frequent use of the steering wheel in the neutral position during travel.

Figure 9:
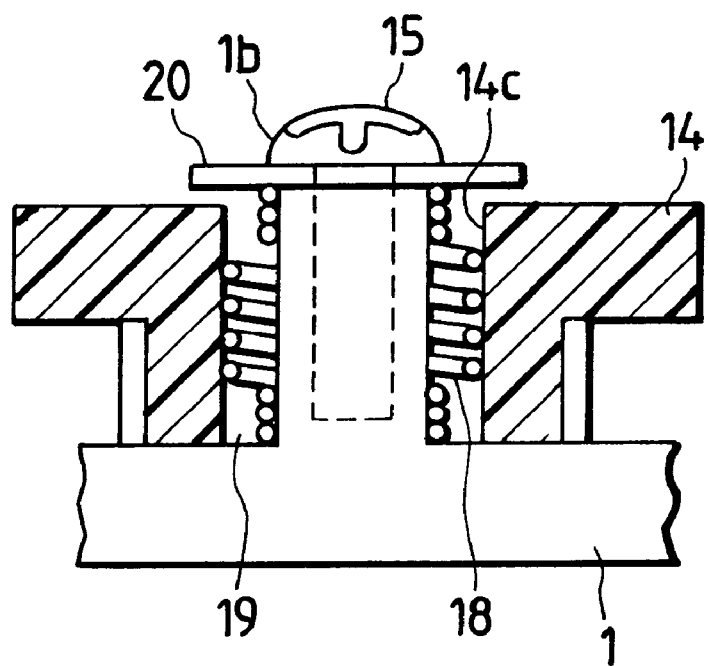
FIG. 9 is a sectional view showing a major portion of the rotation detecting device of a third embodiment according to the present invention.
Figure 10:
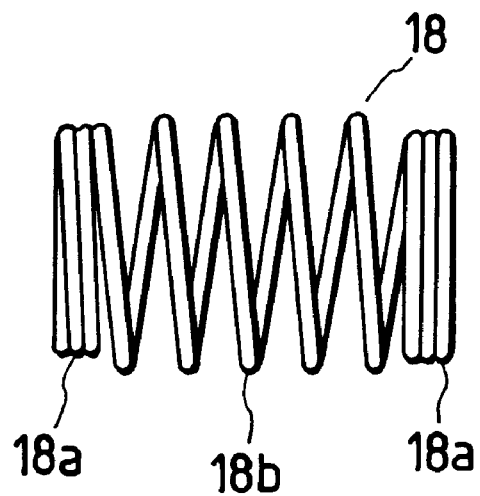
FIG. 10 is a front view of a coil spring provided in the rotation detecting device.

FIGS. 9 to 12 show a third embodiment of the rotation detecting device according to the present invention. FIG. 9 is a sectional view showing the supporting structure of the intermediate gear provided in the gearing; FIG. 10 is a front view of a coil spring used in the supporting structure of FIG. 9; FIG. 11 is an explanatory view of operation of the gearing; and FIG. 12 is view showing a modification of the coil spring.

The third embodiment is much the same in structure as the first embodiment, therefore common members will be explained by referring to the drawings used in the first embodiment. It should be noted that in FIG. 11 almost common members as those in FIG. 7 are designated by the same reference numerals.

As shown in FIGS. 3 and 9, on the inside bottom surface is erected a cylindrical boss 1b. The boss 1b is rotatably inserted in a shaft bore 14c of the intermediate gear 14 through a coil spring 18. The inside diameter of the shaft bore 14c is set a little larger than the outside diameter of the boss 1b; and the coil spring 18 is installed in a clearance 19 of a ring shape as viewed from above and formed by a difference between these diameters. As shown in FIG. 10, the coil spring 18 has a small-diameter portion 18a at either end and a large-diameter portion 18b at center; the both small-diameter portions 18a are wound on the outer peripheral surface of the boss 1b, while the large-diameter portion 18b elastically contacts the inner peripheral surface of the shaft bore 14c. In the boss 1b the screw 15 is installed through a washer 20. The intermediate gear 14 and the coil spring 18 are retained by the washer 20 and the screw 15 from loosening off from the boss 1b.

On the outer peripheral surface of the first rotor 4 are formed the small-diameter portion 4a and a large-diameter portion 4b via a step as shown in FIG. 6; at this step as a boundary, the first tooth portion 14a of the intermediate gear 14 faces the small-diameter portion 4a, and the second tooth portion 14b faces the large-diameter portion 4b. There is formed the clearance groove 16 in one place of the large-diameter portion 4b. On both sides of this clearance groove 16 a pair of engaging projections 17a and 17b are formed. Therefore, as explained below, the engaging projections 17a and 17b intermittently mesh with the first and second tooth portions 14a and 14b of the intermediate gear 14 with the rotation of the rotor member 2 (first rotor 4).

Figure 11A:
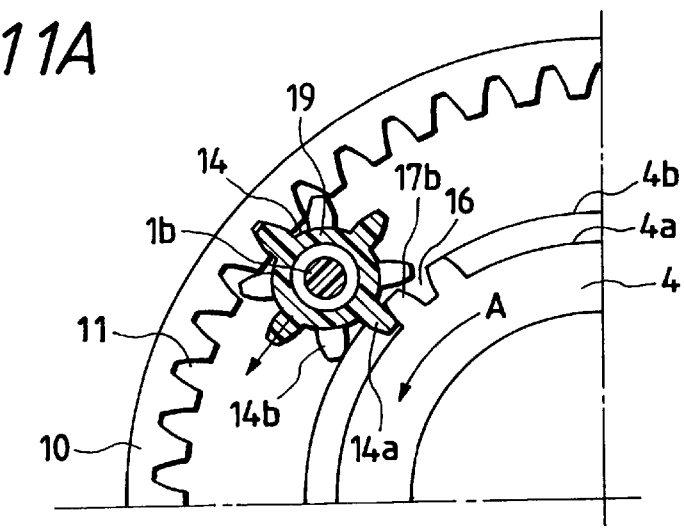
FIG. 11 which is comprised of FIGS. 11A, 11B, and 11C, provide views the operation of the gearing.
Figure 11B:
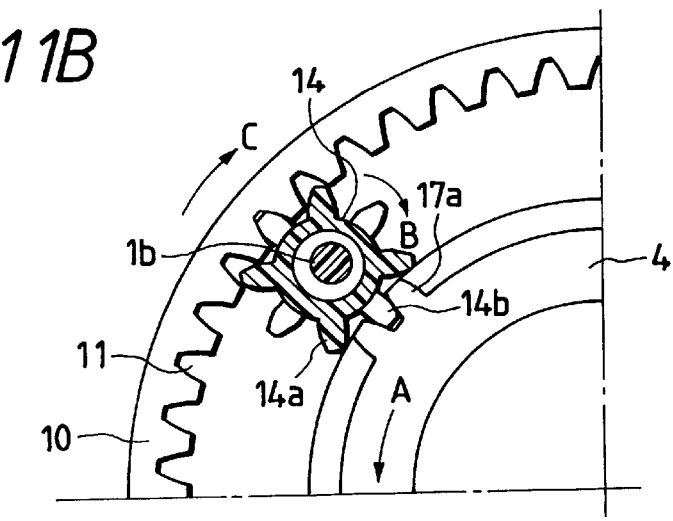
Figure 11C:
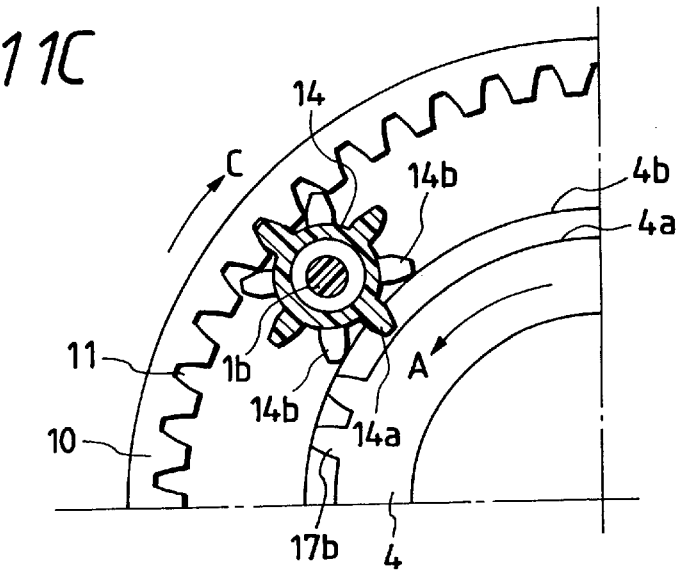

That is, the intermediate gear 14, when not in mesh with the engaging projections 17a and 17b, receives the spring force of the coil spring 18, being centered with respect to the boss 1b, to thereby form a clearance 19 of the same width all around the boss 1b. When the first rotor 4 rotates in the direction of the arrow A (counterclockwise) from the non-meshed state as shown in FIG. 11A until one of the teeth of the first tooth portion 14a facing the small-diameter portion contacts one engaging projection 17b, the intermediate gear 14 turns about 45 degrees in the direction of the arrow B as shown in FIG. 11B, and one of the teeth of the second tooth portion 14b goes into the clearance groove 16. At this time, the coil spring 18 deflects radially the instant the first tooth portion 14a contacts the engaging portion 17b, moving the intermediate gear 14 toward escaping (in the direction of the arrow A) as far as the maximum clearance 19, to thereby considerably reduce the tapping sound. When the first rotor 4 rotates further in the direction of the arrow A from the state shown in FIG. 11B, one of the teeth of the second tooth portion 14b that has entered the clearance groove 16 is pushed by the other engaging projection 17a; thus the intermediate gear 14 further turns about 45 degrees in the direction of the arrow B until the next one of the teeth of the first tooth portion 14a faces again the small-diameter portion 4a as shown in FIG. 11C. That is, because the intermediate gear 14 rotates about 90 degrees in the direction of the arrow B from the state of FIG. 11A to the state of FIG. 11C, the driven gear 11 is turned by two teeth in the direction of the arrow C and the rotating ring 10 rotates by a predetermined amount in the direction of the arrow C. After the passing of the engaging projection 17a through the intermediate gear 14, the intermediate gear 14 is checked from idling because two teeth of the second tooth portion 14b are facing the large-diameter portion 4b during a subsequent rotation of the first rotor 4. Thus the intermediate gear 14 is turned about 90 degrees by the engaging projections 17a and 17b during one rotation of the first rotor 4, and the rotating ring 10 rotates by two teeth of the driven gear 11. Therefore the shield plate 12 also turns by two teeth in the same direction, moving to the shielding position of an adjacent photo-interrupter. That is, as the output of the photo-interrupters 13a to 13e to be energized varies, the absolute position (the number of rotations) of the first rotor 4 can be detected.

Next, operation of the rotation detecting device constituted as previously stated will be explained. For example, when the center photo-interrupter 13c is shielded by the shield plate 12 as shown in FIG. 5, only the photo-interrupter 13c is on while the other photo-interrupters 13a, 13b, 13d and 13e are off. The steering wheel, therefore, will be detected to be within the range of −180 deg to +180 deg with respect to the center reference. In the meantime, the angle of rotation of the steering wheel is accurately detected within the range of −180 deg to +180 deg by each photo-interrupter 9 of the incremental encoder. When the rotor member 2 (the first rotor 4) turns counterclockwise from the state of FIG. 5, the shield plate 12 shields both the center photo-interrupter 13c and an adjacent photo-interrupter 13d, energizing only the photo-interrupters 13c and 13d to detect that the steering wheel is within the range of +180 degrees. Furthermore, when the rotor member 2 rotates counterclockwise to energize only the photo-interrupter 13d, the steering wheel is detected to be within the range of +180 deg to +540 deg. Within this range the angle of rotation of the steering wheel is accurately detected by the incremental encoder. In a similar manner the steering wheel is detected to be within the range of −900 deg to +900 deg by the combination of on-and-off operations of the photo-interrupters 13a to 13e.

FIG. 8 is a figure showing the second embodiment. The outside appearance is the same as the fourth embodiment, which therefore will be explained by using this figure. In the present embodiment, the driven gear 11 is fixedly provided on the stationary housing 1 and also the intermediate gear 14 is rotatably supported on the rotating ring 10 through an unillustrated coil spring. The present embodiment is basically the same in other constitution as the third embodiment.

In the fourth embodiment of the above-described constitution, when the intermediate gear 14 is turned by the engaging projections 17a and 17b during one rotation of the first rotor 4, a tapping sound likely to be produced at the time of contact between the engaging projections 17a and 17b and the intermediate gear 14 is reduced similarly to that in the first embodiment described above. And at the same time the intermediate gear 14 revolves around the first rotor 4 while rotating about 90 degrees, and the rotating ring 10 supporting the intermediate gear 14 rotates by two teeth of the driven gear 11. Accordingly the shield plate 12 provided on the rotating ring 10 also rotates by two teeth, moving the shielding position of the adjacent photo-interrupter. That is, the photo-interrupters 13a to 13e to be energized vary, thereby detecting the absolute position (the number of rotations) of the first rotor 4.

In the third and fourth embodiments, if the intermediate gear 14 and the engaging projections 17a and 17b are so set as not to engage with each other in the neutral position of the steering wheel, it is possible to reduce a noise likely to occur at the time of contact of the intermediate gear 14 with the engaging projections 17a and 17b of the rotor during travel of the vehicle not withstanding frequent use of the steering wheel in the neutral position during travel.

Figure 12A:
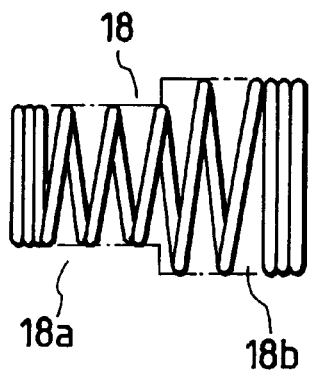
FIGS. 12A and 12B are front views showing a modification of the coil spring.
Figure 12B:
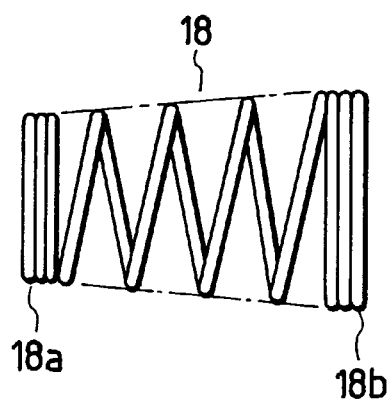

It should be noticed that the shape of the coil spring 18 is not limited to the embodiment described above, and may be various modifications, such as a stepped shape with the small-diameter portion 18a and the large-diameter portion 18b continued as shown in FIG. 12A, or a tapered shape with the small-diameter portion 18a and the large-diameter portion 18b connected aslant, or an unillustrated polygonal coil shape as shown in FIG. 12B.

Furthermore, adopting a flexible material, such as elastomer, as a material of the intermediate gear 14 can further improve a tapping sound reducing effect.

Next, the fifth and sixth embodiments of the present invention will be explained with respect to the photo-interrupter 13 of the first to fourth embodiments.

Figure 13:
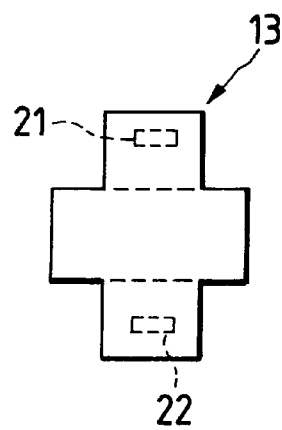
FIG. 13 is a plan view of a photo-interrupter used in an absolute encoder provided in the rotation detecting device.
Figure 14A:
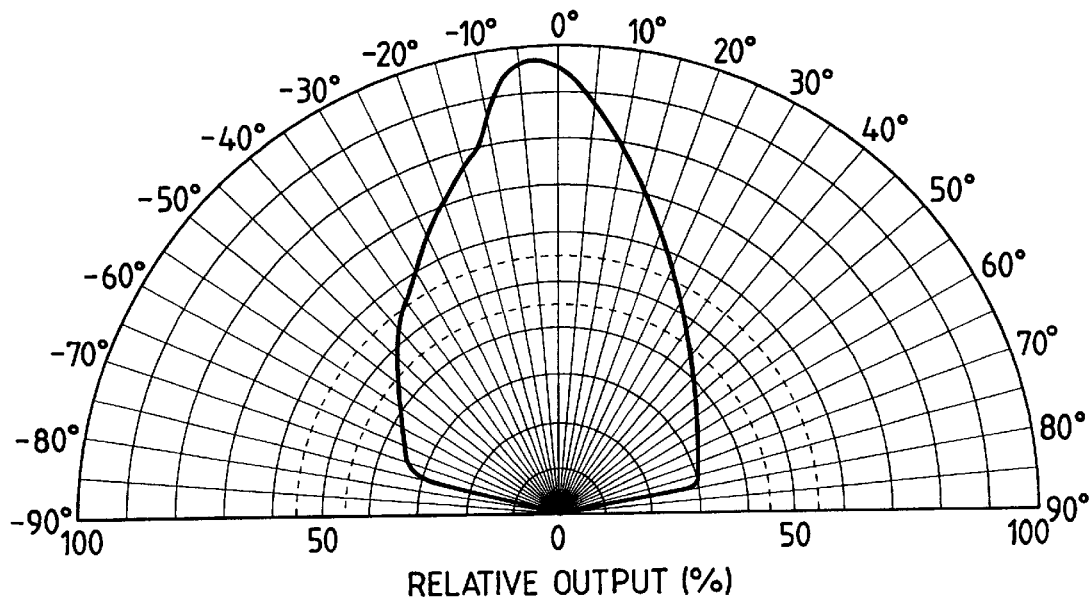
FIGS. 14A and 14B are explanatory views showing the directional pattern of an LED and a photo-transistor constituting the photo-interrupter.
Figure 14B:
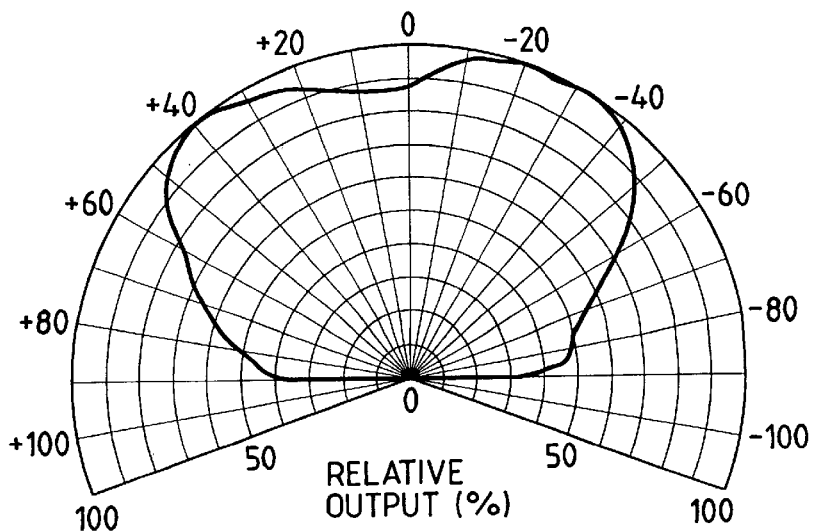
Figure 15:
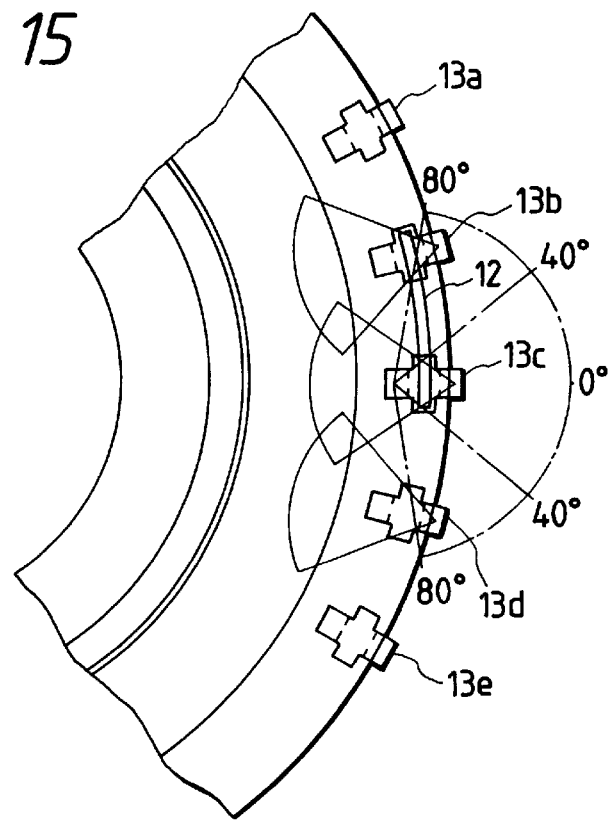
FIG. 15 is a plan view showing a major portion with the photo-transistor disposed on the inner periphery side.
Figure 16:
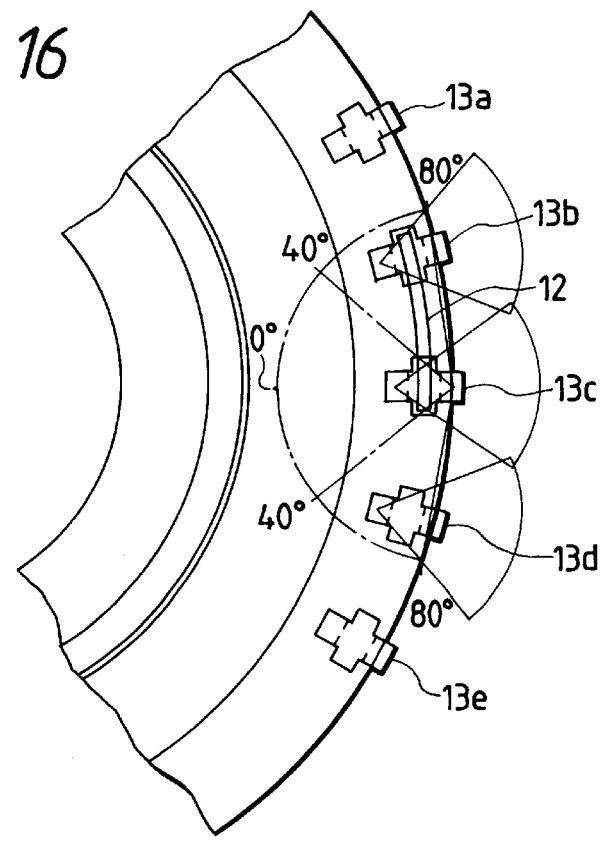
FIG. 16 is a plan view showing a major portion with the photo-transistor disposed on the outer periphery side.

FIG. 13 is a plan view of a photo-interrupter used in the absolute encoder; FIG. 14 is an explanatory view showing the directivity of LED and photo-transistor constituting the photo-interrupter; FIG. 15 is a plan view of a major portion with the photo-transistor arranged on the inner peripheral side; and FIG. 16 is a plan view of a major portion with the photo-transistor arranged on the outer peripheral side.

The photo-interrupter 13 is comprised of a chip of an LED 21 and a chip of a photo-transistor 22 as shown in FIG. 13; the photo-transistor 22 which is a light-receiving element receives the light emitted from the LED which is a light-emitting element, outputting an ON signal. The directional patterns on the LED 21 and photo-transistor 22 sides are largely affected by the width of a slit provided in the (molded) case enclosing the chips, the presence or absence of a lens, or the transparency of the case. Therefore which directional pattern is better can not easily be mentioned; in the case of the present embodiment, however, the photo-transistor 22 has a substantially worse directional pattern than the LED 21. The directional patterns of the LED 21 and the photo-transistor 22 sides are shown in FIG. 14. As is clear from FIG. 14A, the LED 21 has a relatively narrow directivity; the half-value width in which the relative output decreases 50% is around ±35 degrees. On the other hand, as is clear from FIG. 14B, the directional pattern on the photo-transistor 22 side has a wide directivity even in the vicinity of ±40 degrees where 100% relative output is produced. The half-value width thereof is around ±80 degrees.

Figure 19A:
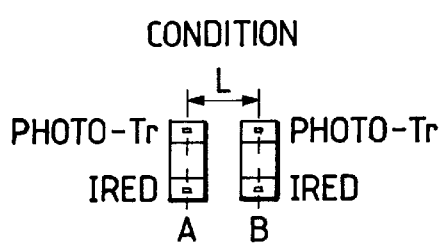
FIGS. 19A and 19B are explanatory views showing an adjacent characteristic of the photo-interrupter.
Figure 19B:
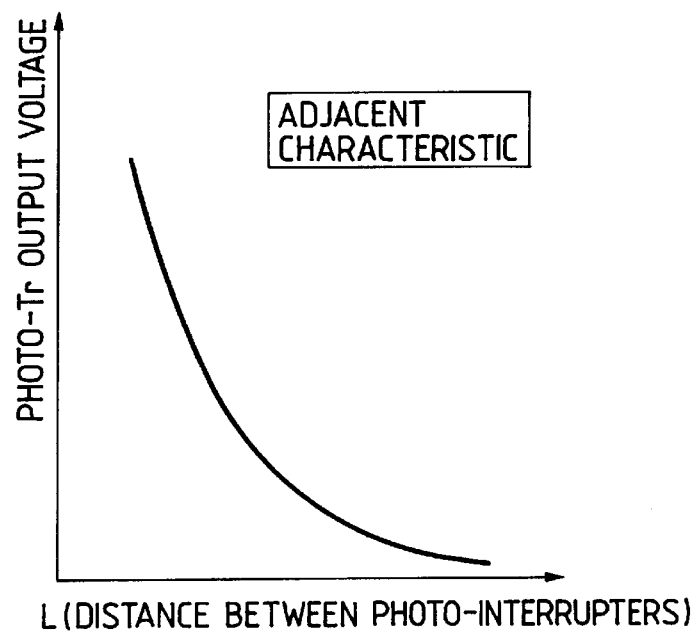

Generally when the disturbance light enters the photo-interrupter, there will occur an error from a primary detecting position as shown in FIG. 18. Also, with a decrease in the distance between the photo-interrupters as shown in FIG. 19, the amount of incident light leaking from the light-emitting element of mutually adjacent photo-interrupters will increase, changing the output voltage. Therefore, when each photo-interrupter 13 (13a to 13e) is arranged as shown in FIG. 15, the photo-transistor 22 having a poor directional pattern (wide directivity) is arranged on the inner periphery side and the LED 21 having a good (narrow directivity) directional pattern is arranged, so that it will be possible to decrease the amount of light emitted from the LED 21 of the photo-interrupters 13b and 13d located adjacently to the photo-interrupter 13c than the other light emitted from the LED 21, and also to minimize the movement of the switching (ON/OFF) position caused by the light from the photo-interrupter 13 located adjacently to a specific photo-interrupter 13. On the contrary to this, as shown in FIG. 16, when the photo-transistor 22 of a poor directional pattern is arranged on the outer peripheral side, the detected amount of light of the LED 21 of the adjacent photo-interrupters 13b and 13d within the range of ±80 degrees which is a half-value width of the photo-transistor 22 increases because the photo-transistor 22 of the photo-interrupter 13c has an inwardly spreading directivity, resulting in a substantial change in the switching (ON/OFF) position and consequently presenting such a problem as an elevated ground level (D level).

FIG. 17 is a plan view showing a major portion of the sixth embodiment of the rotation detecting device according to the present invention. In the present embodiment, a plurality of recesses 23a are formed in the outer peripheral surface of a positioning member 23 which is made of a light-shielding material and the photo-transistor 22 of the photo-interrupters 13a to 13e are arranged in the recess 23a. The present embodiment is basically the same in other points of constitution as the fifth embodiment.

In the sixth embodiment of the above-described constitution, when the photo-interrupters 13a to 13e are mounted on a printed-circuit board not shown, the positioning accuracy of the photo-interrupters 13a to 13e can be improved by the positioning member 23; and also because the direction angle of the photo-transistor 22 is narrowed by the side faces of the recess 23a, it is possible to decrease a change of the switching (ON/OFF) position caused by the detection of light from the light-emitting element of the adjacent photo-interrupter 13 more than in the fifth embodiment described above.

The rotation detecting device embodying the present invention as heretofore explained has the following effects.

The rotation detecting device of the present invention has the rotor member rotating as one body with the code plate of the rotary encoder, the stator member rotatably holding the rotor member, an intermediate gear pivoted on the stator member, the rotating member concentrically arranged on the rotational center of the rotor member, and the detecting element for detecting the amount of rotation of the rotating member; the intermediate gear is intermittently meshed with the engaging projection provided on the peripheral surface of the rotor member, and is in constant mesh with the driven gear provided on the rotating member. During one rotation of the rotor member, therefore, the intermediate gear pivoted on the stator member rotates through a predetermined angle only when it meshes with the engaging projection. Therefore, the driven gear in constant mesh with the intermediate gear also similarly rotates intermittently through only a predetermined angle and accordingly the amount of local wear of mechanical parts resulting from continuous operation can substantially be reduced. At the same time because the driven gear makes a digital rotation, the signal (of the number of rotations) can be taken out quite easily; besides it is unnecessary to form the driven gear all around, there is provided sufficient room for layout of component parts, thereby enabling to build a smaller-size rotation detecting device.

Furthermore, the rotation detecting device has the rotor member rotating as one body with the code plate of the rotary encoder, the stator member rotatably holding the rotor member, the rotating member concentrically arranged on the rotational center of the rotor member, an intermediate gear pivoted on the rotating member, and the detecting element for detecting the amount of rotation of the rotating member. When the intermediate gear is intermittently meshed with the engaging projection provided on the peripheral surface of the rotor member and is in constant mesh with the driven gear provided on the rotor member, the intermediate gear in constant mesh with the driven gear of the stator member engages with the engaging projection during one rotation of the rotor member, rotating and revolving by a predetermined angle. Since the rotating member supporting the intermediate gear rotates by the same amount as the amount of revolution, the amount of local wear of mechanism parts caused by continuous operation can be substantially reduced. Also since the driven gear makes digital rotation, the signal (of the number of rotations) can be taken out very easily. Furthermore, since it is unnecessary to form the driven gear all around, there is provided sufficient room for layout of component parts, thereby enabling to build a smaller-size rotation detecting device.

Furthermore it is possible to prevent the idling of the intermediate gear when the intermediate gear is not in mesh with the engaging projection, by forming small- and large-diameter portions via a step on the peripheral surface of the rotor member, and by forming an engaging projection on either side of the clearance groove formed in the large-diameter portion, and also by alternately forming, on the intermediate gear, the first tooth portion facing the peripheral surface of the small-diameter portion and the second tooth portion facing the peripheral surface of the large-diameter portion.

Furthermore, the intermediate gear in constant mesh with the driven gear intermittently rotates, during one rotation of the rotor member, only when it meshes with the engaging portion, and accordingly the rotating member rotates by a predetermined angle, largely reducing the amount of local wear of mechanism parts likely to be caused by continuous operation. Also since it is unnecessary to form the driven gear all around the periphery, there exists sufficient room for parts layout and accordingly the rotation detecting device can be made smaller. Furthermore, since the intermediate gear moves towards escaping against the elastic member the instant the engaging projection contacts the tooth portion of the intermediate gear, a tapping sound produced the instant the engaging member contacts the intermediate gear can be reduced, thus diminishing vehicle noise.

Furthermore, the rotation detecting device is comprised of the rotor member rotating as one body with the code plate of the rotary encoder, the stator member rotatably holding the rotor member, the rotating member concentrically arranged on the rotational center of the rotor member, the intermediate member intermittently transmitting the rotation of the rotor member to the rotating member, and a plurality of photo-interrupters concentrically arranged on the rotational center of the rotor member. In this rotation detecting device either of the light-emitting element constituting the photo-interrupter or the light-receiving element which has wider directivity is arranged on the inner periphery side, so that the shield plate mounted on the rotating member will pass between the light-receiving element and the light-emitting element of the photo-interrupter to thereby detect the amount of rotation of the rotating member. In this device thus constituted, the amount of rotation of the rotating member which intermittently rotates is detected in a non-contact state by a signal outputted from each photo-interrupter. Thus not only the life of the detecting section can substantially be prolonged but the detected amount of light from the light-emitting element of an adjacent photo-interrupter can be lessened, resulting in a decreased amount of change in the switching (ON/OFF) position and accordingly an improved detecting accuracy.

Furthermore, the positional accuracy of each photo-interrupter can be improved by arranging, within a recess of the positioning member, an element of the photo-interrupter which has a wider directivity, and the directivity of the element thus arranged on the inner periphery side is narrowed by the positioning member; accordingly it becomes possible to reduce the detected amount of light from the light-emitting element of an adjacent photo-interrupter. Therefore the amount of change in the switching (ON/OFF) position can be further decreased.

What is claimed is:

1. A rotation detecting device of a multi-rotation body, comprising: a rotor member rotating as one body with a code plate of a rotary encoder, a stator member rotatably holding said rotor member, an intermediate gear pivoted on said stator member, a rotating member concentrically arranged on the rotational center of said rotor member, and a detecting element for detecting the amount of rotation of said rotating member; said intermediate gear being intermittently engaged with an engaging projection provided on the peripheral surface of said rotor member and in constant mesh with a driven gear provided on said rotating member.

2. A rotation detecting device of a multi-rotation body according to claim 1, wherein a small-diameter portion and a large-diameter portion are formed via a step on the peripheral surface of said rotor member; said engaging projection is provided on either side of a clearance groove formed in said large-diameter portion; and a first tooth portion facing the peripheral surface of said small-diameter portion and a second tooth portion facing the peripheral surface of said large-diameter portion are alternately formed on said intermediate gear.

3. A rotation detecting device of a multi-rotation body, comprising: a rotor member rotating as one body with a code plate of a rotary encoder, a stator member rotatably holding said rotor member, a rotating member concentrically arranged on the rotational center of said rotor member, an intermediate gear pivoted on said rotating member, and a detecting element for detecting the amount of rotation of said rotating member; said intermediate gear being intermittently engaged with an engaging projection provided on the peripheral surface of said rotor member and in constant mesh with a driven gear provided on said stator member.

4. A rotation detecting device of a multi-rotation body according to claim 3, wherein a small-diameter portion and a large-diameter portion are formed via a step on the peripheral surface of said rotor member; said engaging projection is provided on either side of a clearance groove formed in said large-diameter portion; and a first tooth portion facing the peripheral surface of said small-diameter portion and a second tooth portion facing the peripheral surface of said large-diameter portion are alternately formed on said intermediate gear.

5. A rotation detecting device of a multi-rotation body, comprising: a rotor member rotating as one body with a code plate of a rotary encoder, a stator member rotatably holding said rotor member, an intermediate gear rotatably pivoted on said stator member through an elastic member, an engaging projection intermittently meshed with said intermediate gear provided on the peripheral surface of said rotor member, a rotating member concentrically arranged on the rotational center of said rotor member, a driven gear in constant mesh with said intermediate gear provided on said rotating member, and a detecting element for detecting the amount of rotation of said rotating member; said intermediate gear moving radially against said elastic member when engaging with an engaging projection.

6. A rotation detecting device of a multi-rotation body according to claim 5, wherein said elastic member is a coil spring.

7. A rotation detecting device of a multi-rotation body according to claim 6, wherein said coil spring has a large-diameter portion and a small-diameter portion.

8. A rotation detecting device of a multi-rotation body, comprising: a rotor member rotating as one body with a code plate of a rotary encoder, a stator member rotatably holding said rotor member, a rotating member concentrically arranged on the rotational center of said rotor member, an intermediate gear rotatably pivoted on said rotating member through an elastic member, an engaging projection intermittently engaging with said intermittent gear provided on the peripheral surface of said rotor member, a stationary gear in constant mesh with said intermediate gear provided on said stator member, and a detecting element for detecting the amount of rotation of said rotating member; said intermediate gear moving radially against said elastic member when engaging with said engaging projection.

9. A rotation detecting device of a multi-rotation body according to claim 8, wherein said elastic member is a coil spring.

10. A rotation detecting device of a multi-rotation body, comprising: a rotor member rotating as one body with a code plate of a rotary encoder, a stator member rotatably holding said rotor member, a rotating member concentrically arranged on the rotational center of said rotor member, an intermediate gear intermittently transmitting the rotation of said rotor member to said rotating member, and a plurality of photo-interrupters concentrically arranged on the rotational center of said rotor member; of a light-emitting element and a light-receiving element which constitute said photo-interrupters, an element having wider directivity is arranged on the inner periphery side, so that a shield plate provided on said rotating member passes through between said light-emitting element and said light-receiving element of said photo-interrupters, to thereby detect the amount of rotation of said rotating member.

11. A rotation detecting device of a multi-rotation body according to claim 10, wherein said element of said photo-interrupters which has a wider directivity is arranged within a recess formed in a positioning member made of a light-shielding member.

\* \* \* \* \*

UNITED STATES PATENT AND TRADEMARK OFFICE
CERTIFICATE OF CORRECTION

PATENT NO.   : 6,130,425  
DATED        : October 10, 2000  
INVENTOR(S)  : Tadashi Sano Page 1 of 1

It is certified that error appears in the above-identified patent and that said Letters Patent is hereby corrected as shown below:

<u>Title page,</u>  
After item [22], insert a new item as follows:

-- [*] Notice:   This patent issued on a continued prosecution application filed under 37 CFR 1.53(d), and is subject to the twenty year patent term provisions of 35 U.S.C. 154(a) (2). --.

Signed and Sealed this

Nineteenth Day of November, 2002

*Attest:*

*Attesting Officer*

JAMES E. ROGAN  
*Director of the United States Patent and Trademark Office*